(12) United States Patent
Sasidharan et al.

(10) Patent No.: US 11,153,144 B2
(45) Date of Patent: Oct. 19, 2021

(54) SYSTEM AND METHOD OF AUTOMATED FAULT CORRECTION IN A NETWORK ENVIRONMENT

(71) Applicant: Infosys Limited, Bangalore (IN)

(72) Inventors: Sreekanth Sreedevi Sasidharan, Trivandrum (IN); Anu Rajagopal, Trivandrum (IN); Shilpa Sasi, Palakkad (IN); Pinky Painadath Jose, Vazhuthacaud (IN); Anoop Pothen Varghese, Glen Waverley (AU); Shankar Kishan Jayakumaran Nair, Thiruvananthapuram (IN)

(73) Assignee: INFOSYS LIMITED, Bangalore (IN)

( * ) Notice: Subject to any disclaimer, the term of this patent is extended or adjusted under 35 U.S.C. 154(b) by 0 days.

(21) Appl. No.: 16/704,962

(22) Filed: Dec. 5, 2019

(65) Prior Publication Data

US 2020/0204428 A1 Jun. 25, 2020

(30) Foreign Application Priority Data

Dec. 6, 2018 (IN) .............................. 201841046227

(51) Int. Cl.
*H04L 29/14* (2006.01)
*G06N 20/00* (2019.01)
(Continued)

(52) U.S. Cl.
CPC ............ *H04L 29/14* (2013.01); *G06F 11/079* (2013.01); *G06F 11/0793* (2013.01);
(Continued)

(58) Field of Classification Search
None
See application file for complete search history.

(56) References Cited

U.S. PATENT DOCUMENTS 6,353,902 B1 3/2002 Kulatunge et al.
6,615,367 B1* 9/2003 Unkle ................ G05B 23/0229
706/46

(Continued)

FOREIGN PATENT DOCUMENTS

CN          103905237        7/2014
WO         WO2017061895      4/2017
WO         WO 2017/087440    5/2017

OTHER PUBLICATIONS

European Publication with Search Report from counterpart European Patent Application No. EP 19214051, published Jun. 10, 2020, 13 pages.

(Continued)

*Primary Examiner* — Lashonda T Jacobs
(74) *Attorney, Agent, or Firm* — Troutman Pepper Hamilton Sanders LLP (Rochester)

(57) ABSTRACT

Automated fault correction in a network environment comprises identifying a pattern in a set of network events and generating a set of substantiating data for the identified patterns. The method can also identify an occurrence probability value for each network event and generate root cause data based on a ranking for the network events using a set of parameters including the occurrence probability. The method can also be directed to performing a regression of the root cause data against a set of historic data and selecting the root cause with a predefined accuracy as an acceptable candidate. The acceptable candidate is then provided for assisted learning for automated fault correction.

12 Claims, 3 Drawing Sheets

(51) Int. Cl.
  *G06F 11/07* (2006.01)
  *H04L 12/24* (2006.01)
(52) U.S. Cl.
  CPC ......... *G06N 20/00* (2019.01); *H04L 41/0631* (2013.01); *H04L 41/12* (2013.01)

(56) References Cited

U.S. PATENT DOCUMENTS

| | | | | |
|---|---|---|---|---|
| 7,350,107 | B2* | 3/2008 | Thaler | H04L 41/0659 714/26 |
| 8,776,241 | B2 | 7/2014 | Zaitsev | |
| 8,868,987 | B2* | 10/2014 | Wagner | G06F 11/3082 714/57 |
| 8,875,129 | B2* | 10/2014 | Wagner | G06F 9/542 718/1 |
| 8,918,345 | B2* | 12/2014 | Kings | H04L 41/0681 706/12 |
| 9,390,418 | B2 | 7/2016 | Gavan et al. | |
| 11,003,641 | B2* | 5/2021 | Dundjerski | G06F 16/217 |
| 2005/0144151 | A1* | 6/2005 | Fischman | G06N 5/045 706/45 |
| 2007/0074076 | A1* | 3/2007 | Imai | H04L 41/0631 714/26 |
| 2007/0174449 | A1* | 7/2007 | Gupta | H04L 41/147 709/224 |
| 2008/0114874 | A1* | 5/2008 | Meir | H04L 41/12 709/224 |
| 2010/0128600 | A1* | 5/2010 | Srinivasmurthy | H04L 41/0663 370/221 |
| 2013/0218354 | A1* | 8/2013 | San Andres | H02J 13/0006 700/286 |
| 2015/0138989 | A1* | 5/2015 | Polehn | H04W 24/02 370/241 |
| 2016/0292028 | A1 | 10/2016 | Gamage et al. | |
| 2016/0314056 | A1* | 10/2016 | Greene | G06F 11/3664 |
| 2017/0054641 | A1 | 2/2017 | Anerousis et al. | |
| 2017/0097860 | A1* | 4/2017 | Pang | G06F 11/079 |
| 2017/0141945 | A1* | 5/2017 | Giammaria | H04L 41/22 |
| 2018/0255470 | A1* | 9/2018 | Zhang | H04L 41/142 |
| 2019/0165988 | A1* | 5/2019 | Wang | H04L 41/0631 |
| 2019/0294484 | A1* | 9/2019 | Luo | G06F 11/0739 |
| 2019/0327130 | A1* | 10/2019 | Huang | H04L 41/147 |
| 2019/0361767 | A1* | 11/2019 | Karthik | G06F 11/1469 |
| 2020/0084086 | A1* | 3/2020 | Gupta | H04L 41/065 |
| 2020/0106660 | A1* | 4/2020 | Kakani | G06F 11/0709 |
| 2020/0186550 | A1* | 6/2020 | N | H04L 63/1416 |

OTHER PUBLICATIONS

Search Opinion, received in counterpart European Patent Application No. 19214051.5, dated May 4, 2020, published Jun. 10, 2020, 7 pages.

"Predictive Analytics," TATA Communications, retrieved from: http://www.tatacommunications-ts.com/MWC/PDFs/pdf/Predictive%20Analytics.pdf, 2017, 2 pages.

Kahn et al, "Learning Time-based Rules for Prediction of Alarms from Telecom Alarm Data Using Ant Colony Optimization," *International Journal of Computer and Information Technology* (ISSN: 2279-0764) vol. 3, Issue 1, Jan. 2014, 9 pages.

\* cited by examiner

SYSTEM AND METHOD OF AUTOMATED FAULT CORRECTION IN A NETWORK ENVIRONMENT

FIELD

The field relates to automated fault correction in a network environment. More specifically, it involves identifying root cause and using a learning model to provide automated fault correction.

BACKGROUND

Computer networks for many applications are evolving to become more mobile and decentralized. One such application for computer networks is that of battlefield management. Current battlefield management computer networks have addressed to varying extents the fusion of network management systems, information assurance systems, and information dissemination management systems from the perspective of providing a comprehensive status of the deployed network.

In typical computer networks, when an event is detected, the operator is alerted, a trouble ticket is opened, and if necessary, the ticket is escalated to a person skilled in the art. Finally, a user or operator resolves the issue, and the trouble ticket is closed. Throughout this process, operators may make annotations to the ticket, indicating steps taken towards problem resolution. During the time it takes to isolate one fault event and resolve it, any other events of varying severity can be detected, especially in a large, dynamic network. This can quickly result in significant service and network availability problems, as well as information overload for the operator or user responsible for resolving the fault event.

Previously, when network maintenance was entirely dependent on network domain experts, all network logs flowed directly to the Network Operations Centers (NOC) manned by network domain experts. As network growth increased exponentially, so did the number of logs flooding to the NOCs. Due to the frequent inability to foresee the failures, NOC staff operates in a reactive mode to failures that have already occurred, rather than being in a proactive mode to contain failures in their initial stages. Such frequent network failures affect the performance of service providers and result in low customer satisfaction. Thus, the task of identifying the faults and correcting them before it is too late is a critical task of network management.

In typical computer networks, when an event is detected, the operator is alerted, a trouble ticket is opened, and if necessary, the ticket is escalated to a qualified individual. Finally, a user or operator resolves the issue and the trouble ticket is closed. Throughout this process, operators may make annotations to the ticket, indicating steps taken towards problem resolution. During the time it takes to isolate one fault event and resolve it, any other events of varying severity can be detected, especially in a large, dynamic network. This can quickly result in significant service and network availability problems, as well as information overload for the operator or user responsible for resolving the fault event.

In a conventional existing scheme of operation in network environment, the operator manually creates correlation rules in the system using his knowledge. Real-time alarms/events are collected from the network devices or EMS. The alarms are correlated using the correlation rules created by the operator. The root-cause alarms are presented to operators where they take manual actions.

It is hence a goal to predict the faults in telecom networks before catastrophic events happen and services are disrupted. Further goals are to automate the maintenance actions performed by the operators (and thereby reduce the manual effort required by them) and also provide the capability to attach automated actions and workflows with identified patterns so that the system can take self-healing actions.

SUMMARY

Disclosed are a system, method and apparatus for automated fault correction in a network environment.

In one aspect, a method of automated fault correction in a network environment comprises identifying a pattern in a set of network events and generating a set of substantiating data for the identified patterns. The method can also identify an occurrence probability value for each network event and generate root cause data based on a ranking for the network events using a set of parameters including the occurrence probability. The method can also be directed to performing a regression of the root cause data against a set of historic data and selecting the root cause with a predefined accuracy as an acceptable candidate. The acceptable candidate is then provided for assisted learning for automated fault correction.

In another aspect a topology data, a historical alarm and a historical event data set are used to automatically identify patterns in network events.

In yet another aspect the substantiating data is generated based on the topology and a set of time stamp data.

In a further aspect of the invention, the root cause is identified using the historic event data comprising a set of parameters.

In yet another aspect of the invention, the set of parameters include one or more of an occurrence probability rank, severity, chronological order and a topological relationship value.

In one more aspect, the accuracy of the identified root cause is validated based on the historic event data.

In another aspect, a historical known root cause data set is used to validate the predicted root cause by regression.

In another aspect, the validated root cause predicted is marked for the accuracy value with respect to other the validation set of historical known root cause data.

In yet another aspect, a predefined accuracy value is provided as an initial acceptable performance indicator.

In an aspect, the predefined accuracy value may be provided over a network, a user interface or as a prebuild value.

In one more aspect, the predicted root cause is presented for assisted learning for automated fault correction.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of recognizing data in a table area from unstructured data. Although the present embodiments have been described with reference to specific example embodiments, it will be evident that various modifications and changes may be made to these embodiments without departing from the broader spirit and scope of the various embodiments.

The present technologies relate to systems and methods for automated fault correction in a network environment. They can include collecting various parameters like performance management, alarm management, logs and network/service inventory data from networks, learning over time using machine learning, performing real time analytics and self-healing to automatically restore service.

Embodiments may use automated fault correction using machine learning techniques that may be performed using a computing device. The computing device may be initially taught to identify a root cause for a network event. After sufficient learning, samples may be categorized and clustered and machine learning algorithms may be used to automatically identify the clusters and patterns in network events.

Figure 1:
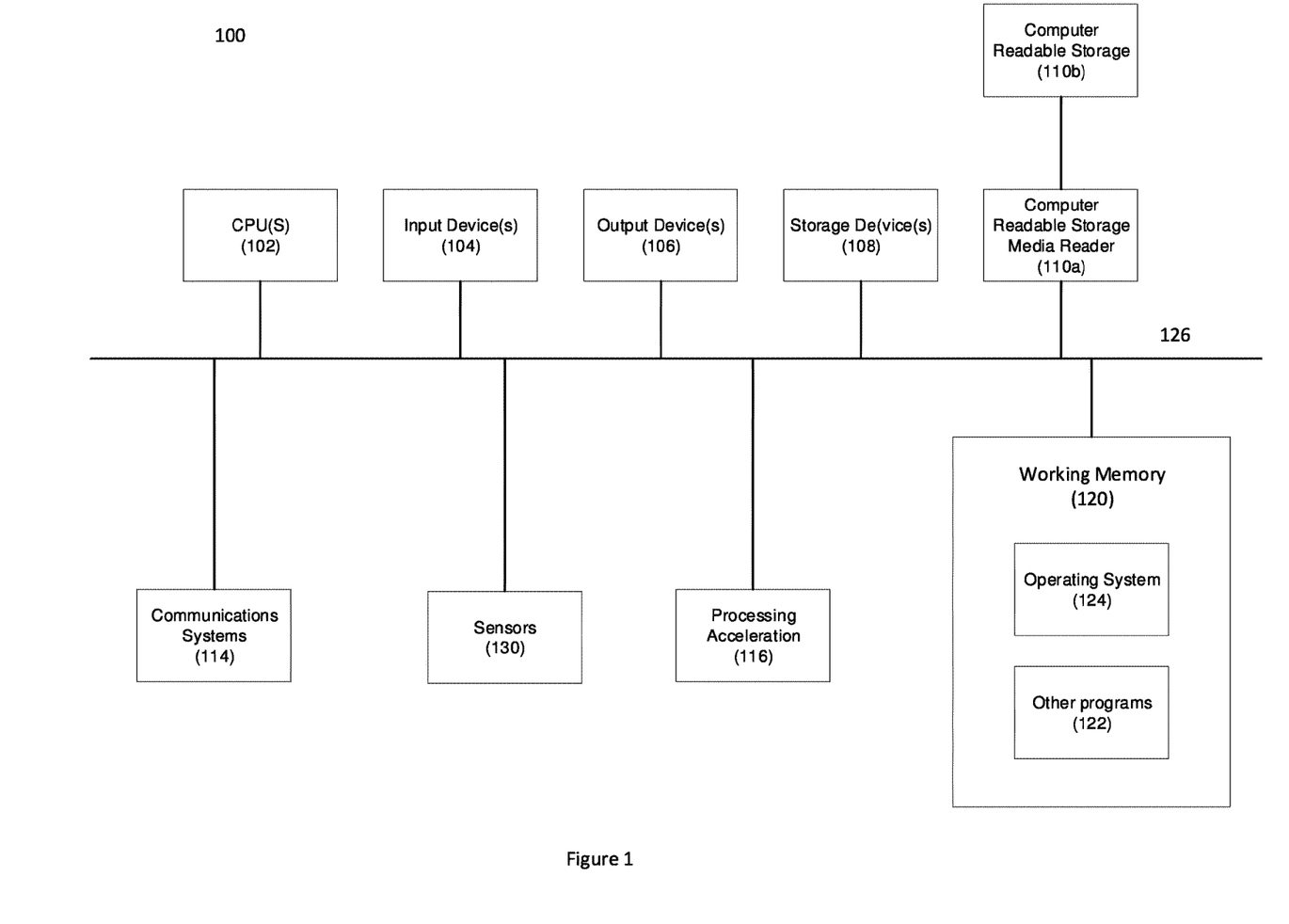
FIG. 1 is a schematic block diagram illustrating the structure of a computer system on which methods of the invention may be embodied.

FIG. 1: Fault correction using machine learning techniques that may be performed using a computing device may be embodied on computation devices, a typical structure for which is shown schematically in FIG. 1. This block diagram broadly illustrates how individual system elements may be implemented in a separated or more integrated manner. The computational device 100 is shown comprising of hardware elements that are communicatively and electronically coupled via bus 126, including a host processor 102, an input device 104, an output device 106, a storage device 108, a computer-readable storage media reader 110a and 110b, a communications system 114, a processing acceleration unit 116 such as a DSP or special-purpose processor, and a memory 118. The computer-readable storage media reader 110 a is further connected to a computer-readable storage medium 110 b, the combination comprehensively representing remote, local, fixed, and/or removable storage devices plus storage media for temporarily and/or more permanently containing computer-readable information. The communications system 114 may comprise a wired, wireless, modem, and/or other type of interfacing connection and permits data to be exchanged. Sensor connection 130 can be included that can be used to couple with a sensor or other data input device. Sensor interface 130, in some embodiments, can input data for real time processing. In other embodiments, sensor interface 130 can input data into storage devices 108 for processing at a later time. Any type of sensor can be used that provides input data signals and/or outcomes.

Computational device 100 can also include software elements, shown as being currently located within working memory 120, including an operating system 124 and other code 122, such as a program designed to implement methods of the invention such as automated fault correction in a network environment, disclosed subsequently in the specification. It will be apparent to those skilled in the art that substantial and justifiable variations may be made in accordance with specific requirements. For example, customized hardware might also be used and/or particular elements might be implemented in hardware, software (including portable software, such as applets), or both. Further, connection to other computing devices such as network input/output devices may be employed.

In order to describe the embodiments of the invention various network related terminologies are used across the description. Though the standard definition of these parameters may be well understood by a person skilled in the art, the brief description of the various terms which are subsequently used as parameters in various embodiments described below.

Timestamp: The events are parsed in the chronological order of time. Timestamp identifies the time at which the event has occurred in the network.

First Occurrence: This denotes the first occurrence of the event from the network element under consideration. The same event may re-occur multiple times Last Occurrence: This denotes the last occurrence of the event or the timestamp when the event was last modified Frequency: This denotes the number of times the event has occurred.

Dwell time: The dwell time denotes the amount of time the event remains active in the system. Some alarms may get cleared very quickly whereas some remain in the system for longer thereby having a smaller or a larger dwell time.

Alert Key: The alert key uniquely identifies the event.

Node type: This field denotes the network element type. The events that are generated from different network element types differ in their node type.

Event Severity: This is the assigned severity of the event. Severity can have values critical, major, minor, warning, clear or information. These can also be represented in numerals like 1 for critical through 5 for clear.

Topology Key: Alert key uniquely identifies the network element in the topology. The same event can be generated by different network elements. Uniquely identifying the network element in the topology is the key for performing topology level patterning. The same is represented as Topology Key.

Neighbouring element as per topology: This is a key attribute to identify topology based patterns. The neighboring element is the immediate neighbor of the network element which has generated the event.

Connected equipment as per the topology: The connected equipment in the topology are identified using the topology key and the input from inventory systems.

Pattern confidence: This denotes the confidence value required for tagging a pattern as valid and to be presented for approval. This is configurable and is set at a predefined value by default. In an ideal scenario, the confidence value would be at 95 percent. More patterns may be identified if the confidence level is set to a lower value, however keeping a high value such as 95 percent will ensure a higher accuracy of the identified pattern and the root cause.

In the instant invention, various approaches are followed to select such data in machine learning systems for automated fault identification and correction in a network environment. Some of these methods are achieved using machine learning algorithms In one embodiment, a method is provided to detect an event in the network. The event may be detected automatically through traditional event detection techniques and/or the event may be detected by a user who provides input to the network elements indicating an event has taken place. Manual generation of trouble tickets for circumstances where an issue is known by a user may be allowed. The event may be any occurrence in the network environment that has a significance for system hardware, software or network applications running on the system within the network. The events may be identified from multiple event sources such as: syslogs, traps, application logs, network alarms, alarms from element management systems and telemetry data coming from network devices. In one embodiment, the event is a fault event. The event may be identified based on parameters but not limited to, topology of the network, a time stamp of occurrence or a message that depicts a probable cause, specific problem and a message text.

Figure 2:
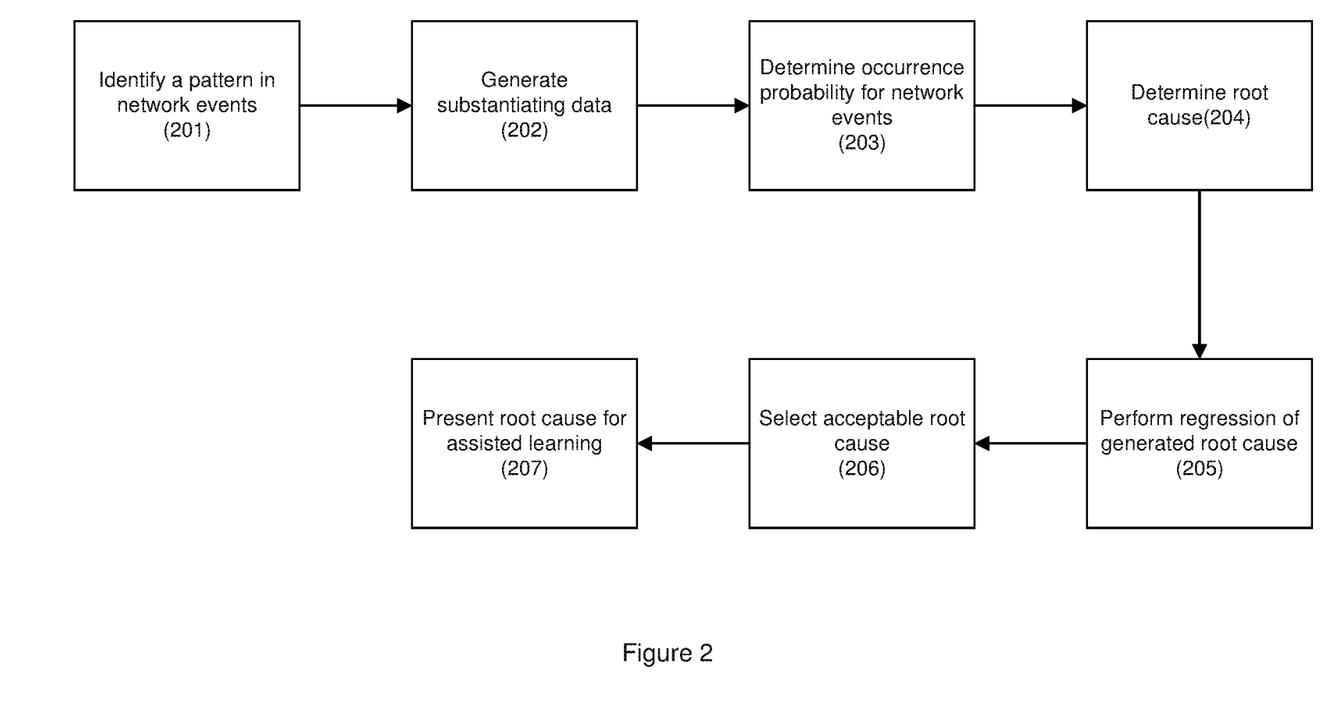
FIG. 2 is a schematic representation of automated fault correction in a network environment according to one embodiment of the invention.

In another embodiment, identifying (201) a pattern in a set of network events is performed using pattern detection algorithms to identify the patterns. Classification of the events from the historical alarms may be performed and the events may be distributed into groups or clusters. A clustering machine learning algorithm may be used to find groups within the event data. Once the algorithm organically identifies the groups using the sample set of data, an iterative refinement may be performed to generate an accurate result. Any known algorithms like K-Means and LDA may be used for this purpose.

In another embodiment a set of substantiating data for the identified pattern may be generated (202) based on parameters, but not limited to, the topology of the data, time stamp and occurrence frequency.

In one more embodiment, patterns of events may be identified which indicate a group of alarms occurring together. A cluster of events may be formed and used for checking event patterns. Subsequently a normalization and division of the event data may be performed into time slices. E.g: 5, 10, 15, minutes. A pattern identification may be performed on the time sliced events, and patterns may be generated. Subsequently a substantiating data for the identified patterns may be generated using one the above described parameters. These identified patterns and substantiating data may be made available for root cause identification.

In another embodiment, an occurrence probability value for each network event is determined (203). Occurrence probability of the events to a cluster is calculated based on the historical occurrence of the events in the cluster. For example: the chance of a battery alarm being marked against the power cluster is checked. The historical data available with the system is mined for the frequency of occurrence and based on the number of time such an occurrence is detected, a probability score is determined. Furthermore, the events with in a cluster is checked for the patterns and they may also be used for the determination of the occurrence probability.

In one more embodiment, the patterns and the substantiating data are used to determine (204) the root cause for the identified patterns from the event data. Conditional probability among the event records may be determined and the events may be ranked based on, but not limited to the probability, frequency of occurrence, severity score, chronological order and topological relationship of the ranked events. Based on the analysis using the above parameters, top ranked event with above marked conditions may be labelled as the root cause. The weightage given to the parameters may vary in different implementations of the method in various scenarios.

In another embodiment, validation of the root cause events is performed (205) through a regression of the root cause data against a set of historic data. The root because which satisfies the criterion may be termed as an acceptable candidate and may be selected (206) based on the regression. The historic data may comprise known root cause scenarios that are provided as a learning data. The learning data consists of correlated events with the appropriate root cause determined either by Manual or automated process.

In one more embodiment, a predefined accuracy value of the root case data may be provided as a stopping criterion to the system. The historical known root cause data set which is a subset of the historical event data may be used to validate the predicted root cause by regression. the validated root cause predicted is marked for the accuracy value with respect to other the validation set of historical known root cause data.

The predefined accuracy value may be provided as an initial acceptable performance indicator and may be provided over a network, a user interface or as a prebuild value. Predefined root cause is based on known similar scenarios. Example: Interface down, BGP down, Node un reachable etc. Interface down is always considered a root cause. The specialized computing device is configured to perform a regression of the known root cause against the predicted root cause using any of the relevant regression techniques and an accuracy is determined and recorded. The accuracy of the identified root cause is validated based on the historic event data.

A number of parameters within the events are used by the algorithms to identify the patterns and root cause. The events are parsed in the chronological order of time. The timestamp identifies the time at which the event has occurred in the network. Based on first occurrence and last occurrence of the events, the time window is calculated. The first occurrence and last occurrence time stamps are also used to determine the chronological order of events. Event Severity is used to differentiate between informational events and alarms. Frequency and the dwell time of the events are used to determine the number of times the event has occurred and the amount of time the event remains active in the system. The alert key is used to uniquely identify the event and Node type is used to classify the events into appropriate network domain. Of the domain grouped events, network topology is used further to narrow down the events, and group the related events as valid patterns. The Topology Key uniquely identifies the network element in the topology and is the key for performing topology level patterning. Neighbouring element and the connected equipment in the topology are used to identify topology based patterns. Pattern confidence, which denotes the level of confidence required for tagging a pattern as valid, is configurable and is kept as a high value such as 95 percent to ensure the accuracy of the identified pattern and the root cause.

Figure 3:
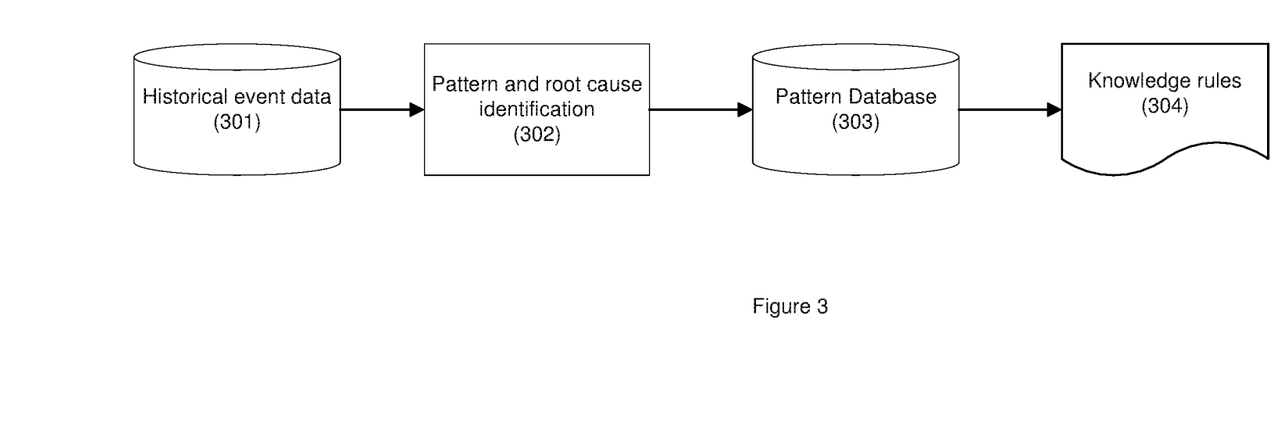
FIG. 3 is a representation of the knowledge rule creation model.

The identified patterns and suggested root cause of the network fault are stored in a pattern database (303) for pattern approval. This suggested root cause is presented to the learning model for assisted learning. An interactive graphical user interface provides ability for the admin operators to review and approve the patterns along with the identified root cause.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In one embodiment, the knowledge rule generation for the assisted machine learning is described The approved patterns may be recorder as knowledge base rule files (304) and are stored in a data management component of the system (303). This knowledge base may be used by the rule engine to perform (302) alarm correlation and root cause analysis using the historical event data (301). As soon as the pattern is approved by the admin operator, the knowledge rule generation engine may record the entries from the data management component and convert it to a knowledge rule.

In yet another embodiment, certain key fields may be used for generation of a knowledge rule. Pattern Definition that defines the pattern rule contains the list of events included in the pattern, the frequency of each event, order of events etc. root cause indicates the root cause alarm of the pattern. Time window is the indicator which defines all the events defined in the pattern to be occurring in order to consider the pattern for matching. The pattern can be linked to an automated workflow, which can be triggered when the pattern occurs in the network and may be referred as Work flow id. Workflow is used to resolve the issues before it happens. Based on the granular pre-learned pattern signature the network event pattern is sensed and appropriate workflow is triggered for resolution of the issue.

Restrict sequencing specifies whether to consider the order of events for the pattern to be matched or not. If the restrict sequencing is true, the order of events is not considered by the correlation engine for pattern matching.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of automated fault correction in a network environment implemented by at least one computing device, the method comprising:
   identifying a pattern in a set of network events;
   generating a set of substantiating data for the identified pattern;
   determining an occurrence probability value for each network event;
   generating root cause data based on a ranking for the network events using a set of parameters including the occurrence probability;
   performing an automatically configured regression of the root cause data against a set of historic data comprising historic known root cause scenarios;
   selecting a root cause with a predefined accuracy as an acceptable candidate based on the performed regression; and
   presenting the acceptable candidate for assisted learning for automated fault correction.

2. The method of claim 1, wherein the identifying the pattern further comprises automatically identifying patterns in the set of network events based on topology data, a historical alarm and historical event data.

3. The method of claim 1, wherein the set of substantiating data is generated based on topology data and a set of time stamp data.

4. The method of claim 1, wherein the historic event data comprises a set of parameters.

5. The method of claim 4, wherein the set of parameters include one or more of an occurrence probability rank, severity, chronological order or a topological relationship value.

6. The method of claim 1 wherein the accuracy of the selected root cause is validated based on the historic event data.

7. A system for automated fault correction in a network environment, comprising:
   a processor; and
   a memory coupled to the processor configured to be capable of executing programmed instructions comprising and stored in the memory to:
   identify a pattern in a set of network events;
   generate a set of substantiating data for the identified pattern;
   identify an occurrence probability value for each network event;

generate root cause data based on a ranking for the network events using a set of parameters including the occurrence probability;

perform an automatically configured regression of the root cause data against a set of historic data comprising historic known root cause scenarios;

select a root cause with a predefined accuracy as an acceptable candidate based on the performed regression; and present the acceptable candidate for assisted learning for automated fault correction.

8. The system of claim 7, wherein the identify the pattern further comprises automatically identifying the pattern in the set of network events based on topology data, a historical alarm and historical event data set.

9. The system of claim 7, wherein the set of substantiating data is generated based on topology data and a set of time stamp data.

10. The system of claim 7, wherein the historic event data comprises a set of parameters.

11. The system of claim 10, wherein the set of parameters include one or more of an occurrence probability rank, severity, chronological order or a topological relationship value.

12. A non-transitory computer readable medium having stored thereon instructions for web browser classification comprising executable code that, when executed by one or more processors, causes the one or more processors to:

identify a pattern in a set of network events;

generate a set of substantiating data for the identified pattern;

identify an occurrence probability value for each network event;

generate root cause data based on a ranking for the network events using a set of parameters including the occurrence probability;

perform an automatically configured regression of the root cause data against a set of historic data comprising historic known root cause scenarios;

select a root cause with a predefined accuracy as an acceptable candidate based on the performed regression; and present the acceptable candidate for assisted learning for automated fault correction.

\* \* \* \* \*